INVENTOR.
ROGER A. SEVERNS

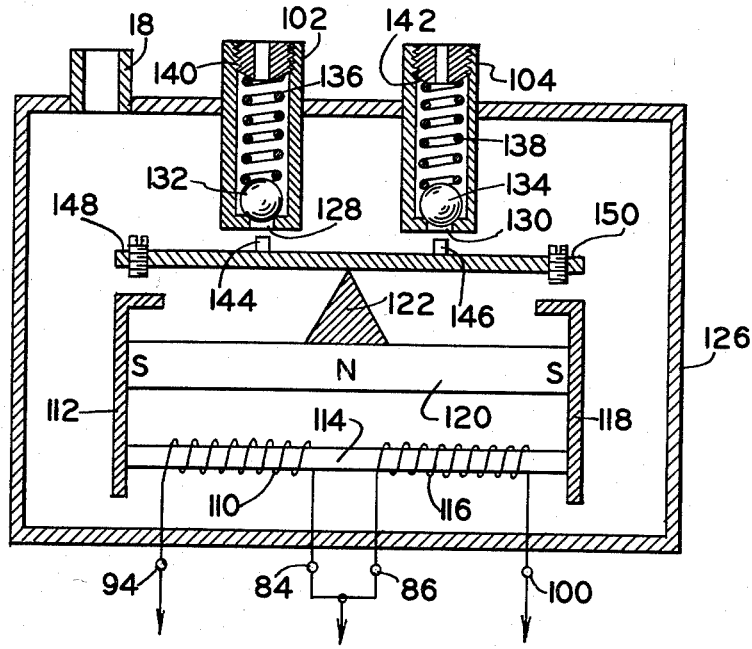
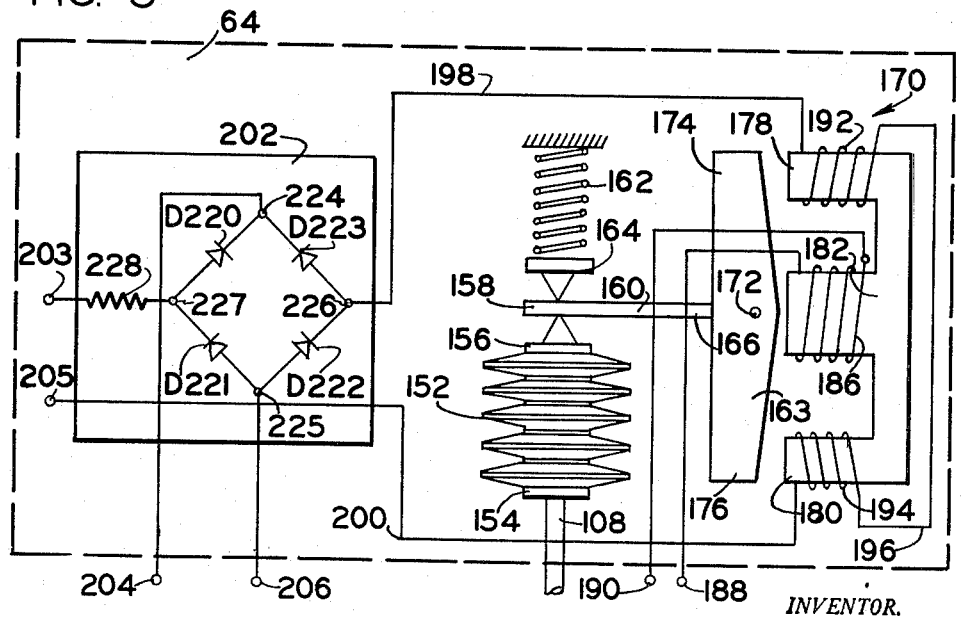

2,941,723

CONDITION-RESPONSIVE CONTROL SYSTEM FOR PRESSURE OPERATED CONTROLS

Roger A. Severns, Scottsdale, Ariz., assignor to The Powers Regulator Company, Skokie, Ill., a corporation of Illinois Filed Sept. 25, 1959, Ser. No. 842,394

7 Claims. (Cl. 236—84)

This invention relates in its broadest aspect to condition-responsive electrical control systems for pressure operated controls. More particularly, it relates to a condition-responsive bridge circuit control system utilized for applying varying pressures to one or more pressure operated controls to vary the setting or position thereof. In the particular embodiment disclosed herein, a thermistor is used as the sensing element in the condition responsive bridge circuit, a tri-stable amplifier is controlled in accordance with the output of the condition responsive bridge circuit, an electro-pneumatic transducer responds to the output from the tri-stable amplifier for varying the pressure to a heating control valve thereby to change the environmental temperature and to achieve balance in the condition-responsive bridge circuit, and a feedback arrangement including a first negative feedback path from the output to the input of the tri-stable amplifier and a second negative feedback path from the output of the electro-pneumatic transducer to the input of the tri-stable amplifier thereby to achieve fast response without oscillation and render the system stable. The system disclosed is, therefore, designed to be used as a temperature control system or thermostat. The pressure operated control incorporated in the system is used to control the flow of a heating fluid medium, which, in turn, controls the ambient temperature sensed by the thermistor.

The invention is equally adapted, however, to being made responsive to changes in humidity, merely by the incorporation of a suitable sensing element in the bridge circuit, the resistance of which changes in response to variations in the humidity.

This application is a continuation-in-part of applicant's co-pending application, Serial No. 638,570, filed February 6, 1957, now abandoned.

In the system of the present invention the sensor bridge is set to maintain, for example, a certain temperature condition. If the temperature changes from that set it produces a condition of bridge unbalance causing a signal of polarity corresponding to direction of change and magnitude corresponding to amount of change to the tri-stable amplifier. Assuming the signal to be negative, the tri-stable amplifier provides a corresponding output signal, which may be negative or positive. Assuming a negative output signal, the first negative feedback path sends a signal for damping the input signal to prevent overshoot. At the same time, the electro-pneumatic transducer is controlled to change the fluid pressure controlling the heating control valve, thereby tending to re-establish the set temperature condition. Change of fluid pressure operates the equipment in the second feedback path to provide a positive signal for bucking the negative signal applied from the sensor bridge. When the second feedback path provides a signal of a magnitude equal and opposite to that of the sensor bridge, then the output of the tri-stable amplifier diminishes to zero and further control of the transducer ceases. Thus there is a null balance achieved between the output of the sensor and that of the second feedback path and the new condition established for the heat control is maintained, as is the signal from the second negative feedback path. As the bridge again approaches balance because of the change in environmental temperature, its signal diminishes to zero so that a new signal is experienced at the input of the tri-stable amplifier and this is mainly that provided by the second feedback path. The system will then work towards a new null balance. This procedure continues until the output of the sensor bridge and that of the second feedback path are diminished to zero at the same time.

The present system is believed to be a novel combination of elements which have been selected for their inherent desirability and also which produce an interaction between elements which is highly desirable. For example, in developing this system it was initially determined that it would be preferable to have a null balance system rather than one of the force balance type. A principal advantage of the null balance type of system is that it requires only intermittent operation, which greatly extends the life expectancy of the system. Likewise, a null balance system can be a non-bleed system in which there is neither waste of air pressure nor small orifices which can readily become clogged or obstructed during the course of normal use.

A second determination made during the development of this system was that the combination of a null balance form and a tri-stable amplifier would form a very desirable combination producing novel results of a character never achieved by previous systems. By tri-stable amplifier is meant an amplifier which is capable of being stabilized in three stages of operation, namely: (1) no output, (2) a positive output, and (3) a negative output. Such an amplifier is normally so designed that a small input signal in a positive direction (above a certain minimum threshold value) will produce a large positive output and likewise, a small negative signal (above a particular threshold value) will produce a large negative output. Such an amplifier rises quickly, although not instantaneously, to a maximum output and lends itself admirably to use with a null balance, non-bleed system, and again, is a component which will have only intermittent operation rather than continuous, and therefore will have a good life expectancy. Because of its tri-stable character, it is also a non-calibrated amplifier and therefore, can be relatively simple in its circuitry and may incorporate a simple, inexpensive magnetic amplifier which, of course, is greatly superior to vacuum tube components from a standpoint of trouble-free operation. Usually the introduction of magnetic amplifiers into such a control system introduced the problem of undesirable control characteristics as a result of line voltage fluctuations. However, the design of the novel circuit, which is the subject matter of this application, is such that this difficulty is substantially overcome. This use of magnetic amplifiers will, therefore, provide a system for which relatively little maintenance is required and because of its non-critical character, one which can be manufactured at a relatively low cost.

Other components in the system also add to these previously mentioned advantages. For example, the use of a direct current bridge in the system eliminates any need for transmission line compensation which would be required for remote installations in the case of alternating current systems. Likewise, the use of a differential transformer as the main component in a feedback generator (of the character described below) which incorporates a bellows is advantageous in that a very low driving force is required, the equipment is simple, has a substantially indefinite life expectancy and its output is substantially immune from noise. Further, the use of a direct feedback from the output of the tri-stable amplifier to its input provides an initial feedback signal which compensates for time delay in the feedback signal from differential transformer path thereby to prevent system excessive overshoot and resulting system oscillations.

It may thus be seen that a null balance electrical control system using a tri-stable amplifier incorporating magnetic amplifiers as a component thereof and utilizing a feedback system including a negative feedback control from the output of the tri-stable amplifier to the input and another negative feedback control from the output of the electro-mechanical transducer including a differential transformer provides a very desirable, accurate and trouble-free control system with a substantially indefinite life expectancy.

It is, therefore, an object of the present invention to provide an improved condition-responsive control system which is sensitive and easily responsive for maintaining a substantially constant environment and which incorporates high stability and reliability with simplicity and low cost.

A further object of the invention is to provide an improved condition-responsive control system for pressure operated controls including a tri-stable control amplifier provided with a direct negative feedback system from the output to the input thereof arranged so as to provide a damping signal to the input of the amplifier to prevent short-term oscillations or chatter and a further negative feedback control for stabilizing the system against long-term hunting oscillations.

An additional object of the invention is to provide an improved control system having high stability and reliability in its control components thereby adding to the long life and easy maintenance of the system.

A further object of the invention is to provide an improved condition-responsive control system for pressure operated controls having but small amounts of heat losses therein thereby permitting the control equipment to be rendered environment insensitive by encapsulation or otherwise sealed against air, dirt and moisture.

An additional object of the invention is to provide an improved control system of the type described which will provide its own compensation for any variations in the line supply voltage to the system or to variations in the pressure from the air pressure supply system.

Additional objects of the invention pertain to the structure and arrangements whereby the above described objects and other objects of the invention are attained.

The invention, both as to its structure and mode of operation, will be better understood by reference to the following specification and drawings.

In the drawings:

Figure 2 is a view in vertical crss-section of the electro-pneumatic transducer shown diagrammatically in Figure 1; and Figure 3 is a somewhat diagrammatic showing of the details of construction of the feedback generator shown in Figure 1.

Figure 1:
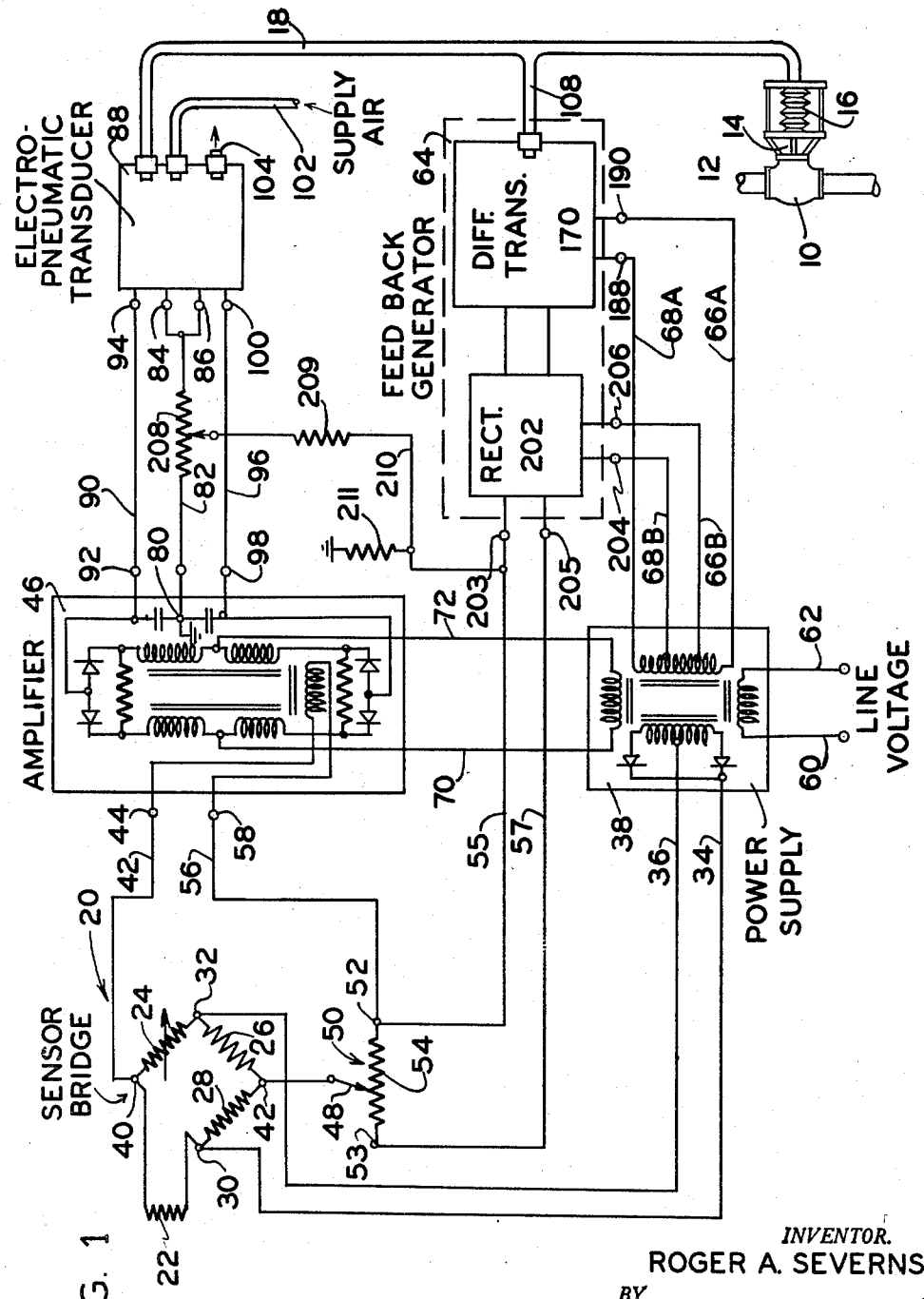
Figure 1 is a somewhat diagrammatic circuit diagram of one form of a condition-responsive control system for pressure operated controls incorporating the invention.

Referring now to Figure 1, a condition-responsive control system is shown therein somewhat diagrammatically, which system is adapted to control a pressure operated control device such as the flow valve 10 in the fluid conduit 12. The conduit 12 may be a part of a combined heating and cooling system, and the valve 10 may be provided with an operating shaft 14, the operation of which is controlled by the bellows 16. The particular system disclosed in the drawings is designed for electro-pneumatic operation with the branch line 18 supplying controlled pressure to the bellows 16 in a manner which will be subsequently described.

The control system is made up of a plurality of components, one of which is the sensor bridge, indicated generally by the numeral 20. This component may be in the form of a Wheatstone bridge circuit. The four sides of the bridge circuit are made up of the thermally responsive resistance 22, the manually variable resistance 24, and the fixed resistances 26 and 28. The thermally responsive resistance 22 can be in the form of a thermistor.

The input terminals 30 and 32 of the bridge circuit 20 have connected thereto the input lines 34 and 36, respectively, which lines provide a source of direct current voltage from the power pack diagrammatically illustrated as the block 38. This voltage in the apparatus illustrated may have a value of 10 volts with the lead 34 being positive and the lead 36 being negative.

The output terminal 40 of the sensor bridge 20 is connected to the input terminal 44 of the tri-stable amplifier illustrated as, but not necessarily limited to, a magnetic amplifier in the box 46. The second output terminal 42 of the sensor bridge is connected to the movable arm 48 of the potentiometer, indicated generally by the numeral 50, which functions as a throttling range control. One end 52 of the resistance 54 of the potentiometer 50 is connected through the line 56 to the other input terminal 58 of the amplifier 46. The output of the sensor bridge is, therefore, fed to the amplifier 46 through a selected portion of the resistance 54 of the potentiometer 50. The two ends 52 and 53 of the resistance 54 of the potentiometer 50 are also connected to the output side of the feedback generator 64 through the lines 55 and 57.

The power supply 38 is connected as indicated to a line voltage through the lines 60 and 62, which voltage may be the conventional 115 volt alternating current. The power supply 38 provides a second output voltage of approximately 24 volts alternating current through lines 66A and 68A to the terminals 188 and 190 of the feedback generator 64 and provides a third output voltage which may be an alternating current less than 24 volts through the lines 66B and 68B to the terminals 204 and 206 of the feedback generator 64. A fourth output voltage from the power supply is fed through the lines 70 and 72 to the amplifier 46 previously mentioned. This is also an alternating current voltage and may be of a magnitude suitable for the particular amplifier utilized.

The output of the tri-stable amplifier 46 is center-tapped to ground, as shown in Figure 1, at the point 80. The line 82 connects this grounded point through the resistance element of a potentiometer 208 to the input terminals 84 and 86 of the electropneumatic transducer illustrated diagrammatically in Figure 1 by the block 88. An additional line 90 connects the output terminal 92 of the amplifier to the input terminal 94 of the transducer 88, and a third line 96 connects the output terminal 98 of the amplifier to the input terminal 100 of the transducer.

With this arrangement, either a positive or negative output signal from the amplifier can be fed to the transducer for a purpose which will later appear. The transducer, in addition to these electrical connections, also has a pneumatic conduit 102 forming a connection to the air supply. A pneumatic vent 104 is provided on the transducer opening to the atmosphere, and a second conduit 18, as previously mentioned, connects the transducer to the bellows 16 in the flow valve 10. A third conduit 108 forms a pneumatic connection between the conduit 18 and the feedback generator 64.

As previously stated, in place of this pneumatic system a hydraulic system could be used. In such an instance, the vent 104 would need to be replaced by a conduit to a reservoir or sump, but otherwise the system would be substantially the same.

The center tap of the potentiometer 208 connected between the output of the amplifier 46 and the input of the transducer 88 is connected through a load resistor 209 and a conductor 210 to the conductor 55 and to a resistor 211 extending to ground potential.

Referring again to the sensor bridge 20 in the conduit illustrated in Figure 1, the thermistor 22 therein is so chosen that by manual adjustment of the variable resistance 24 a particular temperature setting may be selected to be maintained by the control system. When the resistance of the thermistor 22 and the resistance of the variable resistance 24 are substantially the same, there will be no input through the lines 42 and 56 to the amplifier 46. There will also be no output from the amplifier 46 and the electro-pneumatic transducer 88 will remain stabilized and therefore apply a constant pressure to the conduit 18. The flow valve 10 is, therefore, held in stabilized position of adjustment.

With a change in temperature, however, the resistance of the thermistor 22 will be altered. Depending upon the direction of the change in the temperature, the resistance will be increased or decreased, and the output of the sensor bridge will likewise be positive or negative. The magnitude of the output will be proportional to the magnitude of the change in temperature.

A positive signal applied from the sensor bridge to the amplifier, above a minimum threshold value, will cause the amplifier to produce a positive output signal, and likewise, a negative input signal from the sensor bridge to the amplifier, below a minimum threshold value, will cause the amplifier to produce a negative output signal. As previously stated, the output voltage of the amplifier will be fed to the electro-pneumatic transducer 88 by the lines 82, 90 and 96. Assuming that line 90 is connected to the positive output side of the amplifier, if a positive signal is generated thereby, it will be fed across the winding 110 shown in Figure 2. This winding is associated with one end 112 of the electromagnet 114. A second winding 116 is associated with the opposite end thereof and is connected across the lines 82 and 96 so that a negative voltage from the amplifier will be applied thereto. In the form of transducer shown in Figure 2, end pieces 112 and 118 are disposed in association with these two ends of electromagnet 114 and a permanent magnet 120 is also provided therebetween. A fulcrum or pivot point 122 is disposed substantially at the mid-point of the magnet 120, and an armature 124 is pivotally supported thereon so that its two ends are normally in spaced relation to the ends 112 and 118 of the electromagnet 114.

The assembly just described is contained within a sealed housing 126, with which the pneumatic conduits 18, 102 and 104 are in communication, as previously indicated. As shown in Figure 2, the inner extremities of the conduits 102 and 104 have the valve seats 128 and 130 formed thereon, respectively, upon which the two ball valves 132 and 134 are adapted to be normally seated. Springs 136 and 138 are disposed between the shoulders 140 and 142 in the conduits 102 and 104, respectively, and normally urge the ball valves 132 and 134 to closed position. The armature 124 is provided with a pair of upstanding probes 144 and 146, which are in alignment with the valve seats 128 and 130. Tilting of the armature 124 will cause the probe which is on the raised end of the armature to be brought into abutment with the ball valve associated therewith, and if the armature is moved a sufficient distance, the ball will be lifted off of its seat.

More specifically, if a positive voltage is fed through the lines 98 and 82 across the winding 110 of the electromagnet 114, the end 148 of the armature 124 will be drawn downwardly, as shown in Figure 2. This will cause the opposite end 150 of the armature to rise and bring the probe 146 into abutment with the ball valve 134. Further movement in this direction will cause the ball valve 134 to be lifted off the seat 130 and will open the interior of the housing 126 to the atmosphere. If the pressure within the housing 126 has been above atmospheric pressure, this will, of course, cause the pressure within the housing to be lowered.

Conversely, if a negative voltage is applied to the coil 116 of the electromagnet 114 through the lines 82 and 96, the end 150 of the armature 124 will be drawn downwardly, as viewed in Figure 2, so that the end 148 will rise and bring the probe 144 into abutment with the ball valve 132. A lifting of the valve 132 from the seat 128 will open the interior of the housing 126 to the supply pressure in the conduit 102 which will normally cause the pressure within the housing 126 to rise.

Since the conduit 18 establishes communication between the interior of the housing 126 and the bellows 16 of the flow valve 10, changes in pressure within the housing 126 will be communicated to the bellows 16 of the valve 10 and the position thereof will be altered accordingly.

From the foregoing, it is clear that the application of a control signal to the electro-pneumatic transducer 88 causes a direct and corresponding variation in fluid pressure in the branch line 18. This is in clear contrast to the "bleed" type control wherein it is necessary to utilize the pressure variation derived from the bleed control to control another mechanical pressure amplifier for performing the eventual control function. Further, by the very nature of the electro-pneumatic transducer described, it is not important as to the magnitude of the control signals used in the arrangement nor the amount of fluid pressure controlled directly by the unit.

If no other controls were provided, the output from the amplifier 46, once initiated by an ambient temperature change or a change in the selected temperature level to be maintained, would continue until such time as the temperature had been brought back to its original or newly selected value by operation of the control apparatus which, in this case, would be the flow valve 10. Needless to say, this type of arrangement would not be completely satisfactory. In the case of a change in the ambient temperature, the initial output from the amplifier 46 would cause the flow valve 10 to be repositioned as described. This, in turn, would cause a change in the flow of a heating or cooling medium in the conduit 12 in a direction such as to tend to restore the original temperature. Such a change would bring about a restoration of the ambient temperature to its previous value so that the output of the amplifier 46 would be gradually reduced to zero, but in all likelihood would overshoot so that the temperature would rise beyond the selected value. This would, in turn, cause an output of reverse polarity from the amplifier and under such conditions of operation a serious hunting problem would ensue.

In order to overcome this difficulty, a feedback generator is provided, as represented by the block 64 in Figure 1. As there shown, the conduit 108 forms a connection between the feedback generator and the conduit 18. As shown in the diagrammatic representation in Figure 3, the feedback generator 64 is made up of the differential transformer 170 and a phase-sensitive rectifier 202. In the differential transformer 170, the conduit 108 is connected to the bellows 152, one end 154 of which is rigidly mounted, and the opposite end 156 of which is disposed in operative association with the free end 158 of the lever arm 160. A compression spring 162 is similarly mounted in opposition to the bellows 152, having its end 164 disposed in operative association with the end 158 of the lever arm 160. Expansion and contraction of the bellows 152 will thus cause movement of the lever arm 160 in opposite directions.

The opposite end 166 of the lever arm 160 is secured to a movable core section 168 of a differential transformer, indicated generally by the numeral 170. The core section 168 is pivotally mounted at the point 172 so that the two ends 174 and 176 thereof can be moved into or out of association with the outer ends of the two outer legs 178 and 180 of the fixed three-legged core section 182. The center leg 184 of the fixed core section 182 has its outer end disposed in close association with the pivot point 172. A winding 186 is provided thereon forming the primary winding of the differential transformer, with its terminals 188 and 190 being connected to the lines 66 and 68 from the power supply previously mentioned, through which a 24 volt alternating current is applied.

The two outer legs 178 and 180 are provided with windings 192 and 194, respectively, which are connected in series-opposed relation by the line 196. Two output lines 198 and 200 from these windings are connected to a suitable phase sensitive rectifier indicated diagrammatically by the block 202 in Figure 3.

The phase-sensitive rectifier 202 is made up of a plurality of diodes D220, D221, D222 and D223 connected in a bridge type circuit with the oppositely disposed pair of terminals 224 and 225 connected respectively to the supply terminals 204 and 206. The junction 226 of the matrix is connected to the output conductor 198 of the differential transformer 170 and the opposite junction 227 is connected through a load resistor 228 to the output terminal 203. The other output terminal 205 of the feedback generator is connected directly to the conductor 200 of the differential transformer 170.

As previously indicated, the position of the movable core portion 168 will be determined by the position of the bellows 152. This, in turn, is controlled by the pressure in the conduit 108 which is the same pressure as that applied to the bellows 16. This pressure is, therefore, indicative of the position of adjustment of the control valve 10. Changes in the position of the core section 168 will vary the reactance of the two outer legs 178 and 180 of the transformer 170. If the input voltage to the exciter coil or primary winding 186 is constant, a variation in the position of the pivotally mounted core section 168 will, in turn, cause a variation in the magnitude of the output of the coils 192 and 194. Since these coils are in series-opposed relation, if the output of each coil is of the same magnitude, the actual output of the differential transformer under such circumstances will be zero.

This is true since the output of one coil is 180° out of phase with the output of the other coil. If the position of the pivotal core 168 is changed so that the output of one of the coils is increased, the output of the differential transformer will have a given magnitude and will be of a phase corresponding to the phase of the voltage having the greater magnitude. On the other hand, if the output of the other coil is increased by the opposite pivotal movement of the core 168, the phase of the output voltage will be shifted 180°. Variations in pressure in the bellows 152, therefore, will be translated into variations in the magnitude and phase of an output voltage from the differential transformer 170. The phase of the output voltage will correspond to the direction in which the core 168 is tilted, and the magnitude will correspond to the amount of tilting. The phase will, therefore, also correspond to the direction in the change of pressure, and the magnitude will correspond to the amount of change in pressure in the branch line.

As previously stated, the output from the differential transformer 170 is fed to the phase-sensitive rectifier 202 so that it produces a direct current voltage which is either positive or negative, depending upon the phase of the input voltage. The output of the rectifier also has a magnitude commensurate with that of the input voltage.

The output of the rectifier 202 is the output of the feedback generator 64 at the terminals 203 and 205 and is applied across the resistor 54 of the potentiometer 50, as previously stated, through the lines 55 and 57. The circuit is so designed that the feedback voltage fed to the potentiometer 50 has a polarity opposite to the voltage generated by the sensor bridge. Therefore, as soon as the feedback voltage applied to the sensor bridge circuit reaches a value equal and opposite to the output of the sensor bridge, the output of the amplifier 46 returns to zero and the system is stabilized. The potentiometer 50 provides a means of applying a selected portion of the feedback voltage in opposition to the voltage of the sensor bridge. The amount of change in the branch line pressure produced by a given output from the sensor bridge can thus be controlled by the potentiometer 50. Every time there is a change in branch line pressure a new setting of the flow valve 10 will have been achieved, which setting will be maintained until such time as the ambient temperature changes sufficiently to cause the resistance of the thermistor to move back toward the value for which the sensor bridge was originally set.

The foregoing described feedback control from the feedback generator 64 is particularly effective in those circumstances where the ambient temperature change sensed by the thermistor is relatively sudden and of a gross magnitude. In such a circumstance, it is expected that the system would take an elapsed period to restore the ambient temperature condition in the environment. The control effect of the feedback generator 64 is adequate and satisfactory for accomplishing such a purpose. However, in a system where it is desired to provide great sensitivity for quick response and even temperature control certain deficiencies are experienced in relying entirely upon the feedback control furnished by the feedback generator 64. This is particularly true because the electro-pneumatic transducer and the differential transformer each suffers an inherent mechanical time lag which is necessarily apparent in the feedback path including the feedback generator 64. Thus in the circumstance where a change in temperature is slight in magnitude, the electro-pneumatic transducer is operated to correct for the change. Because of the time lag in the system, the control valve 10 will continue to provide correction even after the input signal to the amplifier has been bucked-out or reduced to zero so that thereafter the feedback generator will provide an increased signal to the tri-stable amplifier which in turn responds as though a new change has occurred in the temperature negative to that for which it had just corrected. Accordingly, the tri-stable amplifier will provide a signal for again correcting the position of the control valve 10 in the direction opposite to the last control and the feedback generator will again be controlled to provide a feedback signal. The sum result of this activity is to produce an oscillation within the system that is self-sustaining.

To overcome this condition, and to provide sensitivity to the system for maintaining even temperature control, a damping feedback is introduced into the system by means of the potentiometer 208, load resistor 209, the conductor 210 to the conductor 55 and the parallel resistor 211 to ground. Thus in the circumstance where a control signal is sent from the tri-stable amplifier 46 to the electro-pneumatic transducer 88 a corresponding signal proportioned according to the setting of the center tap in the potentiometer 208 and negative in polarity is applied almost instantaneously through this feedback connection to the conductor 55 and to the input of the tri-stable amplifier in a manner as explained previously. This negative feedback signal serves to damp the input and, accordingly, the output of the tri-stable amplifier, thereby tending to prevent overshoot or, inasmuch as overshoot is inherent to the system, to prevent excessive overshoot. As the output of the feedback generator builds up, the input to the tri-stable amplifier decreases to zero and with it the negative feedback signal from the potentiometer 208. Thus the feedback from the feedback generator 64 and that tapped at the potentiometer 208 are supplemental to one another.

In view of the foregoing, it is easy to understand that by virtue of the two feedback paths, the control system in accordance with the present arrangement is made to be not only stable but extremely sensitive so as easily to maintain a substantially uniform temperature in the environment of small temperature changes and to adjust effectively and promptly for larger temperature changes.

The input voltage applied to the sensor bridge 20 through the lines 34 and 36 may be from a 10 volt center-tapped source in the power supply 38. With such an arrangement, the positive terminal 30 of the sensor bridge will be at +5 volts and the negative input terminal 32 will be at −5 volts. If the potential drop across the resistors 28 and 26 is the same, the output terminal 42 of the bridge will be at zero potential. Likewise, if the potential drop across the resistors 22 and 24 is the same, the other output terminal 40 of the bridge will also be at zero potential. Under such conditions the sensor bridge will have no output. Since the resistance value of the resistor 22 depends upon the temperature to which it is exposed and since the resistance value of the resistor 24 can be manually selected, in order to produce no output from the sensor bridge, the temperature to which the resistor 22 is exposed must be such as to give that resistance a value substantially equal to the selected value of the variable resistor 24.

For example, assuming that the resistance of the resistor 24 has been set to the value of resistance which the resistor 22 will have at a temperature of 72°, if the temperature of the resistor 22 is below this, the sensor bridge will produce an output voltage of a polarity such that the control system will cause the valve 10 to be opened (in the case of a heating system) an amount commensurate with the magnitude of the signal from the sensor bridge. At the same time a feedback signal of an opposite polarity will be fed via the conductor 210 to the input of the control system thereby tending to initially damp that output voltage caused by the sensor bridge. This signal is substantially instantaneous and is quickly dissipated with the growth of the feedback signal from the feedback generator 64.

The same adjustment of pressure in the branch line which controls the setting of the valve 10 is communicated to the feedback generator 64, is previously described. The output signal of the feedback generator, being of opposite polarity, will reduce the output of the sensor bridge to zero and the resistance will be stabilized with the valve 10 disposed at a new setting. This new setting of the valve 10 in the case of a heating system will cause the temperature of the medium with which the resistor 22 is associated to rise. This, in turn, will cause the resistance of the resistor 22 to move toward the value selected for the resistor 24 and the output of the sensor bridge will drop below the value of the output of the feedback generator previously established. A signal of polarity opposite to the original signal will then be fed to the amplifier. This signal will cause an output voltage to be generated by the amplifier opposite in polarity to the original signal therefrom which will cause a repositioning of the armature 124 in the electro-pneumatic transducer. As previously explained, a substantially instantaneous negative feedback signal is returned via the conductor 210 to the input of the control system. A readjustment of the pressure in the branch line 18 will be thus accomplished which will cause the valve 10 to be moved to a new position and, likewise, will reduce the output of the feedback generator until the sensor bridge output is again zero. This type of readjustment will repeatedly occur until such time as a position of the valve 10 has been achieved that will cause the temperature of the medium with which the resistor 22 is associated to be held at a value such that the value of resistance of the resistor 22 is substantially equal to the value of resistance to which the resistor 24 has been set.

The end result is that once a particular value has been selected for the resistor 24, the control system will maintain a temperature such that the value of resistance of the resistor 22 is equal to that of resistor 24. Such a system, as previously mentioned, provides a very reliable and accurate means of control for pressure operated devices such as the valve 10. The components of the system are such that the apparatus will have a very high stability and reliability, and yet which are relatively inexpensive both from a standpoint of the initial cost and maintenance.

In the drawings and specification, there has been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A null balance, non-bleed, condition-responsive electrical control system for pressure operated controls in a temperature control system comprising: a Wheatstone bridge supplied from a direct current source, a pair of output terminals, a temperature responsive resistor in one arm of said bridge, and a variable control resistor in another arm of said bridge, said variable resistor establishing the condition of bridge balance so that the output therefrom is a direct current signal of a magnitude and polarity corresponding to the temperature variation at said temperature responsive resistor, a tri-stable amplifier having output terminals providing a signal of a polarity in accordance with the polarity of the signal applied to the input terminals, and means for connecting the output terminals of said bridge to the input terminals of said amplifier; a pressure operated control member, an electro-fluid pressure transducer having applied thereto the output signal of said tri-stable amplifier, a supply line connecting a source of fluid under pressure to said transducer, an exhaust line for reducing pressure in said transducer, and a branch line from said transducer to said pressure operated control, said transducer including an exhaust line valve member and a supply line valve member each of a non-continuous flow type selectively controlled for varying the fluid pressure in said transducer and said branch line in accordance with the signals from said tristable amplifier; and feedback control to the input of said tri-stable amplifier including means connected directly from the output to the input of said amplifier for applying to said input terminals a first negative feedback voltage proportional to the output voltage thereof, and a feedback voltage generator controlled by changes in fluid pressure in said branch line for applying to the input terminals of said amplifier a second negative feedback voltage corresponding to the change in pressure in said branch line; whereby responsive to a temperature variation at said temperature responsive resistor said tristable amplifier is controlled by the output signal of said bridge which is modified thereafter initially by said first negative feedback signal and subsequently by said second negative feedback signal.

2. A null balance, non-bleed, condition-responsive electrical control system for pressure operated controls in a temperature control system comprising: a Wheatstone bridge having a pair of input terminals supplied from a direct current source, a pair of output terminals, a temperature responsive resistor in one arm of said bridge so that the output therefrom is a direct current signal of a magnitude and polarity corresponding to the temperature variation at said temperature responsive resistor; a tri-stable amplifier having separate positive and negative output circuits selectively providing output signals in accordance with the polarity of the signals applied to the input terminals, and means for connecting the output terminals of said bridge to the input terminals of said amplifier; an electro-fluid pressure transducer having applied thereto the output signals of said tri-stable amplifier, a supply line connecting a source of fluid under pressure to said transducer, said transducer including valve members of the non-continuous flow type controlled for varying the fluid pressure in said transducer and a connected branch line in accordance with the signals from said tri-stable amplifier; and feedback control to the input of said tri-stable amplifier including means connected directly between the output and the input of said amplifier for applying to said input terminals a first negative feedback voltage proportional to the output voltage thereof, and a feedback voltage generator controlled by changes in fluid pressure in said branch line for applying to the input terminals of said amplifier a second negative feedback voltage corresponding to the change in pressure in said branch line; whereby responsive to a temperature variation at said temperature responsive resistor said tri-stable amplifier is controlled by the output signal of said bridge which is modified thereafter initially by said first negative feedback signal and subsequently by said second negative feedback signal.

3. A null balance, non-bleed, condition-responsive electrical control system of the character described in claim 2 further characterized in that said transducer has a pair of electro-magnetically actuated valve members controlling the input of fluid pressure thereto and the output of fluid pressure therefrom, one of which is actuated by a positive input signal and the other by a negative input signal.

4. A condition-responsive control system of the character described in claim 2 further characterized in that said feedback voltage generator comprises a differential transformer with a movable core and a fluid pressure operated activating member for moving said core in accordance with changes in said fluid pressure.

5. A condition-responsive control system for fluid pressure operated controls comprising, bridge circuit means for producing an output voltage of a magnitude and polarity in accordance with unbalance in the bridge and corresponding to the magnitude and direction of change in the condition being controlled, tri-stable means for amplifying said output voltage and having a positive output circuit and a negative output circuit, a transducer including an electro-magnet having two energizing coils thereon and a pivoted valve actuating member adapted to be positioned by said electro-magnet, one of said energizing coils being connected to said positive output circuit of said tri-stable means and the other of said energizing coils being connected to the negative output circuit, a pair of non-continuous flow type valve members operable by said actuating member to control the fluid pressure in said transducer, means for applying the resultant fluid pressure in said transducer to a pressure operated control and feedback control means including a first negative feedback loop from the output of said tri-stable means to the input thereof, and a second negative feedback loop between the output of said transducer and the input of said tri-stable means, whereby the condition being controlled is closely regulated to balance said bridge.

6. A null balance, non-bleed, condition-responsive electrical control system for pressure operated controls in a temperature control system comprising: a Wheatstone bridge having a pair of input terminals supplied from a direct current source, a pair of output terminals, a temperature responsive resistor in one arm of said bridge, and a variable control resistor in another arm of said bridge, said variable resistor establishing the condition of bridge balance so that the output therefrom is a direct current signal of a magnitude and polarity corresponding to the temperature variation at said temperature responsive resistor; a tri-stable amplifier having output terminals providing a signal of a polarity corresponding to the polarity of the signal applied to the input terminals, said amplifier providing a maximum positive output signal when the input signal rises above a selected positive threshold value and providing a maximum negative output signal when the input signal rises above a selected negative threshold value and providing no output signal in the circumstance of no input signal and means for connecting the output terminals of said bridge to the input terminals of said amplifier; an electro-fluid pressure transducer having applied thereto the output signal of said tri-stable amplifier, a supply line connecting a source of fluid under pressure to said transducer, and a branch line from said transducer to a pressure operated control, said transducer including valve members of the non-continuous flow type controlled for varying the fluid pressure in said transducer and a connected branch line in accordance with the signals from said tri-stable amplifier; and feedback control to the input of said tri-stable amplifier including means connected directly between the output and the input of said amplifier for applying to said input terminals a first negative feedback voltage proportional to the output voltage thereof, and a feedback voltage generator controlled by changes in fluid pressure in said branch line for applying to the input terminals of said amplifier a second negative feedback voltage corresponding to the change in pressure in said branch line; whereby responsive to a temperature variation at said temperature responsive resistor said tri-stable amplifier is controlled by a signal from said bridge which signal is modified thereafter initially by said first negative feedback signal and subsequently by said second negative feedback signal.

7. A null balance, non-bleed, condition-responsive electrical control system for pressure operated controls in a temperature control system comprising: a Wheatstone bridge having a pair of input terminals supplied from a direct current source, a pair of output terminals, a temperature responsive resistor in one arm of said bridge, and a variable control resistance in another arm of said bridge, said variable resistor establishing the condition of bridge balance so that the output therefrom is a direct current signal of a magnitude and polarity corresponding to the temperature variation at said temperature responsive resistor; a tri-stable amplifier having output terminals providing a signal of a polarity corresponding to the polarity of the signal applied to the input terminals, said amplifier providing a maximum positive output signal when the input signal rises above a selected positive threshold value and providing a maximum negative output signal when the input signal rises above a selected negative threshold value and providing a substantially diminished output signal under other conditions, and means for connecting the ouput terminals of said bridge to the input terminals of said amplifier; a pressure operated control member, an electro-fluid pressure transducer having applied thereto the output signal of said tri-stable amplifier, a supply line connecting a source of fluid under pressure to said transducer, a first non-continuous flow type valve member selectively controlled from said transducer for controlling the pressure established in said transducer from said supply line, a second non-continuous flow type valve member selectively controlled from said transducer for venting the pressures established in said transducer, and a branch line from said transducer to said pressure operated control, and feedback control to the input of said tri-stable amplifier including means connected directly between the output and the input of said amplifier for applying to said input terminals a first negative feedback voltage proportional to the output voltage thereof, and a feedback voltage generator controlled by changes in fluid pressure in said branch line for applying to the input terminals of said amplifier a second negative feedback voltage corresponding to the change in pressure in said branch line; whereby responsive to a temperature variation at said temperature responsive resistor said tristable amplifier is controlled by the output signal of said bridge which is modified thereafter initially by said first negative feedback signal and subsequently by said second negative feedback signal.

References Cited in the file of this patent

UNITED STATES PATENTS

| | | |
|---|---|---|
| 2,208,421 | Hanna | July 16, 1940 |
| 2,601,867 | Alyea | July 1, 1952 |
| 2,768,345 | Ogle et al. | Oct. 23, 1956 |